July 2, 1963 M. ANDERSON 3,096,410
LOW TIRE INDICATING DEVICE
Filed Dec. 19, 1961 2 Sheets-Sheet 1
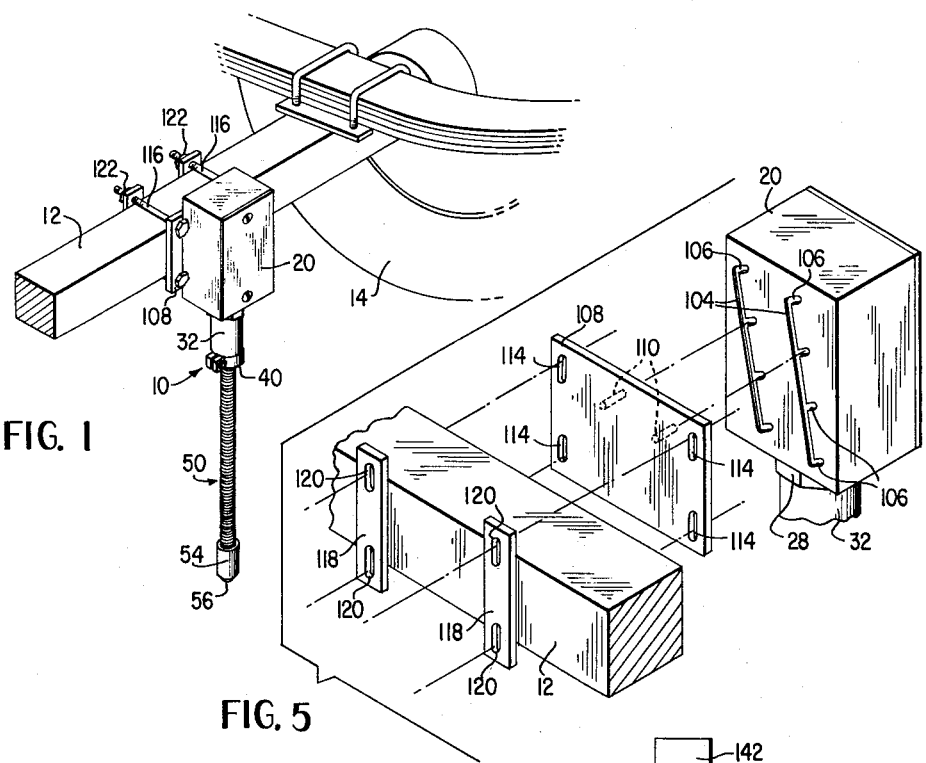
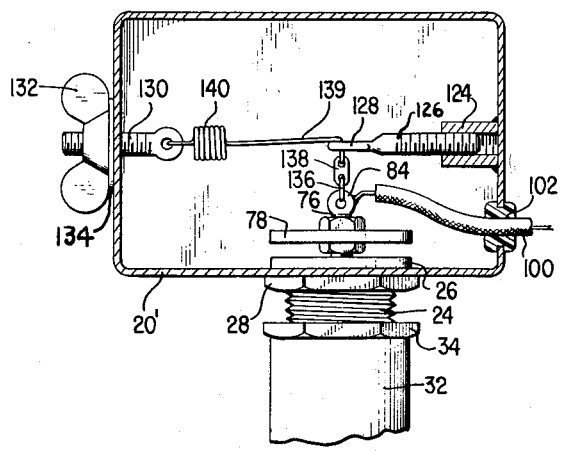
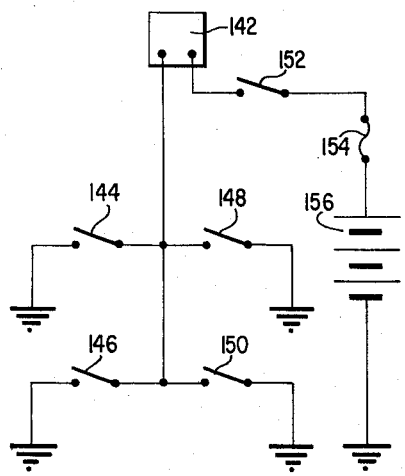
INVENTOR.
MITCHELL ANDERSON
BY *Shapiro and Shapiro*
ATTORNEYS.

July 2, 1963
M. ANDERSON
3,096,410
LOW TIRE INDICATING DEVICE
Filed Dec. 19, 1961
2 Sheets-Sheet 2
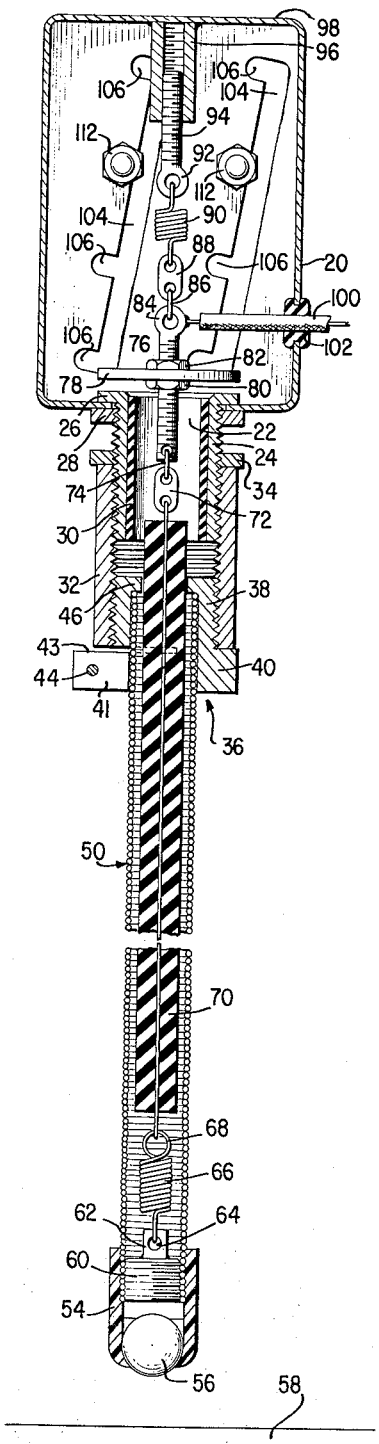
FIG. 2
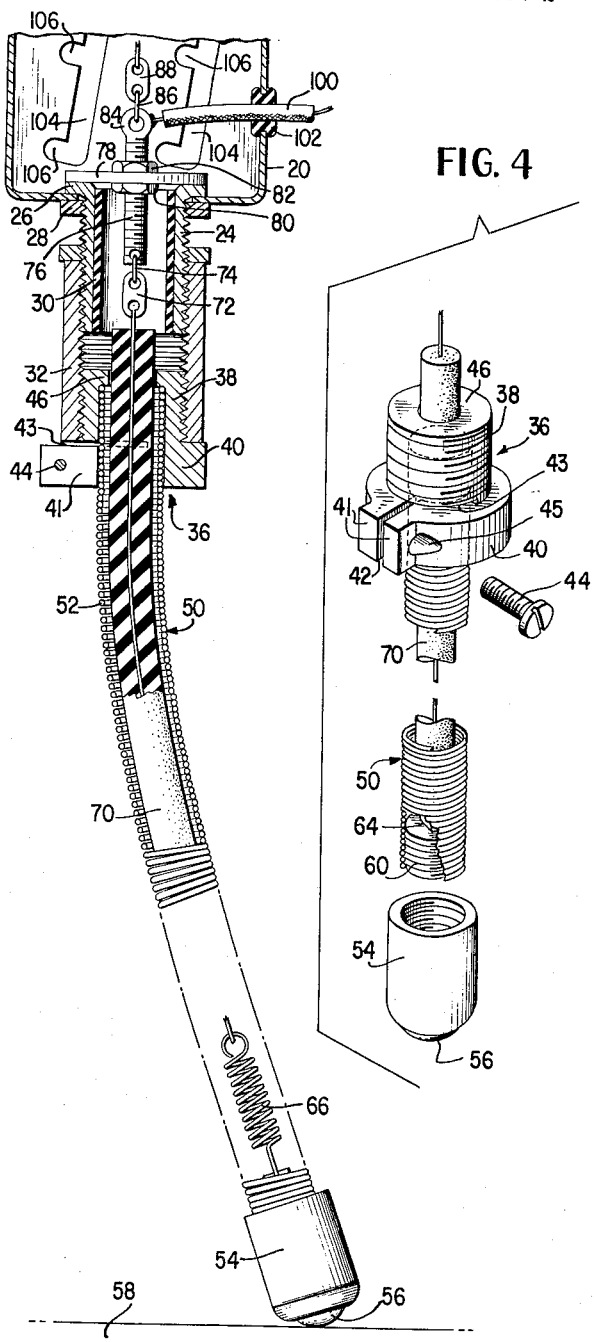
FIG. 3
FIG. 4
INVENTOR.
MITCHELL ANDERSON
BY *Shapiro and Shapiro*
ATTORNEYS.

United States Patent Office 3,096,410
Patented July 2, 1963

3,096,410
LOW TIRE INDICATING DEVICE
Mitchell Anderson, 2710 SE. Courtney Road,
Portland 22, Oreg.
Filed Dec. 19, 1961, Ser. No. 160,465
16 Claims. (Cl. 200—61.24)

This invention relates to a low tire indicating device and, more particularly, to a device of the type wherein a switch, responsive to tire deflation is employed for closing an indicating circuit.

Low tire indicators of this type commonly employ a switch-actuating feeler element which is appropriately mounted on the chassis of a pneumatic tired vehicle so as to remain out of engagement with the ground for normal tire inflation but to come into engagement with the ground upon deflation of a tire. It has been suggested, in a particular prior art device, that the feeler element comprises a vertically disposed, tightly coiled tubular spring member adapted to be mounted at its upper end on the chassis of the vehicle. In this device, a flexible but inextensible cable is axially located within, and connected to the lower end of, the spring member. A flexible guide sleeve surrounds the cable and has its outer surface against the spring member. The upper end of the cable is connected to an upwardly biased spiral spring switch contact. Upon engagement of the feeler element with the ground, the tubular spring member bends, and this distortion pulls the cable downwardly to bring the upwardly biased switch contact into engagement with a pair of stationary switch contacts to close the indicator circuit.

The foregoing device is subject to certain disadvantages. The feeler element will occasionally come into contact with bumps or objects in the roadway which will cause excessive bending of the spring member and apply undue tension to the cable. This may result in breakage of the cable and distortion of the spiral spring switch contact. Engagement between the spiral spring switch contact and the pair of stationary contacts is inexact, particularly after rough usage has tilted or bent the spiral spring switch contact. Wear of the ground-engaging tip of the feeler element is often excessive. Because of the need for the guide sleeve around the cable, the feeler does not bend readily and requires an offset tip to produce the desired bending. Moreover, the cable is subjected to substantial friction in its movement.

It is accordingly a principal object of this invention to provide an improved tire deflation indicating device of the foregoing type.

A more specific object of this invention is to provide protective means to limit the tension applied to the cable after it has brought the switch contacts into firm engagement with each other.

It is another object of this invention to provide switch contacts in a low tire indicating device which will close positively without regard to any tilting or bending of the movable switch contact. Moreover, it is an object of this invention to provide rugged switch contacts not readily subject to distortion.

An additional object is to provide a device of the foregoing type having greater flexibility, minimum operational friction, an in-line ground-engaging element, and requiring only one lead wire.

It is a further object of this invention to provide a low tire indicating device with a ground-engaging member in the form of a rolling ball, whereby wear on this member may be reduced.

It is an additional object of this invention to provide a housing for a low tire indicating device which may be adjustably mounted on the axle, or axle housing, of a pneumatic tired vehicle, such as a trailer, automobile, or truck.

It is sometimes necessary to mount the low tire indicating device of this invention on vehicles having limited clearance above the axle or axle housing. Accordingly, it is yet another object of this invention to provide an embodiment of a low tire indicating device which may be mounted on an axle or axle housing without extending substantially above the upper surface of the axle or axle housing.

It is still another object of this invention to provide a low tire indicating device which may be conveniently used with vehicles having different ground to axle or axle housing spacings, in which the distance of the ground-engaging member from the roadway may be easily adjusted after the device is mounted on the vehicle, so as to accommodate different tire inflations or loads, and which may be adjusted as to sensitivity, whereby the indicator circuit will be closed only after a predetermined deflation of a tire.

Briefly, but without limitation, a preferred device of the invention comprises a hollow, elongated, bendable spring member which depends from a housing adjustably mounted on an axle, or axle housing, of a vehicle adjacent a tire thereof with the lower end of the spring member spaced above the roadway for normal tire inflation. A tensioned switch control member extends upwardly through, but air-spaced from the inside of, the spring member and is coupled to the lower end of the spring member by means of a protective spring and to the housing by means of a biasing spring of greater flexibility. A first discoidal switch contact is coupled to the switch control member and is, for normal tire inflation, maintained in spaced confronting relation to an annular switch contact mounted on the housing. When the tire becomes deflated, a ground-engaging ball mounted on the lower end of the spring member comes into engagement with the roadway, bending the spring member and causing the lower end of the spring member to pull downwardly on the switch control element against the bias of the biasing spring and bring the first switch contact into firm engagement with the second switch contact. The protective spring may expand after closing of the contacts, to limit the tension in the switch control member.

The foregoing and other objects, features, and advantages of the invention and the exact manner in which the same are accomplished will become more readily apparent upon consideration of the following detailed descriptions of exemplary forms of the invention taken in conjunction with the accompanying drawings, which illustrate such forms and wherein:

FIGURE 1 is a perspective view showing a device of the invention mounted on an axle of a pneumatic tired vehicle;

FIGURE 2 is a vertical section view of one embodiment of the device, showing the disposition of the parts thereof for normal tire inflation, with the ground-engaging member spaced above the roadway;

FIGURE 3 is a vertical section view, similar to that of FIGURE 2, showing the disposition of the parts upon deflation of a tire, with the ground-engaging member in contact with the roadway;

FIGURE 4 is a fragmentary exploded perspective view illustrating certain parts of the device;

FIGURE 5 is an exploded perspective view showing the manner in which the housing may be mounted on an axle of a vehicle;

FIGURE 6 is a fragmentary vertical section view of a second embodiment of the invention; and FIGURE 7 is a circuit diagram showing how several of the devices of the invention may be interconnected with an alarm or signalling device.

Referring to the drawings, FIGURE 1 illustrates the manner in which one form of the low tire indicating device of this invention is mounted on a vehicle. The device, generally indicated by the reference numeral 10, is mounted on a fixed axle 12 of a pneumatic tired vehicle, such as a trailer, automobile or truck, in the general vicinity of a tire 14, the condition of which is to be monitored by the device. While the device has been shown mounted on axle 12, it is to be understood that it may also be mounted on an axle housing or other appropriate chassis part. Further reference to the mounting components will be made later.

As shown in FIGURE 2, the device comprises a housing 20 of generally rectangular shape and provided with an opening 22 in a bottom wall thereof. One of the walls of the housing, such as the front wall, may be removable to provide interior access. An externally threaded nipple 24 depends from the opening and is secured therein by means of an integral upper flange 26 engaging the inside surface of the bottom wall of the housing adjacent the opening. A lock nut 28 threaded on the exterior of the nipple engages the outside surface of the bottom wall of the housing adjacent the opening. A sleeve of insulating material 30, which may, for example, comprise insulating tape, lines the inside surface of the nipple 24. An internally threaded pipe coupling 32 is threaded on the lower end of nipple 24. A lock nut 34 is also threaded on the exterior of nipple 24 adjacent the upper end of pipe coupling 32.

A tubular clamping member generally indicated by the reference numeral 36, comprises an upper portion 38, externally threaded to be received within pipe coupling 32 at the lower end thereof. Integral with the upper portion 38 is a split lower portion 40 of greater external diameter (see FIG. 4). The portion 40 is generally cylindrical but is provided with a pair of spaced legs 41 divided from the upper portion by a slot 43 and separated by a vertical slit 42 which splits the lower portion of the clamping member. A screw 44 is provided to extend through two aligned openings 45 on opposite sides of the slit 42 to receive a nut (not shown) for adjusting the clamping pressure. The upper portion 38 is provided with an inwardly extending shoulder 46 at its upper end. An elongated, tubular, closely coiled spring member 50 is received within the clamping member 36 with its upper end abutting shoulder 46. Tightening of screw 44 serves to clamp the upper end of spring member 50 within clamping member 36.

Spring member 50 is formed of a strong but flexible material, such as spring steel. Because it is tightly wound, the spring cannot compress when subjected to a compressive force, but instead the spring bends as shown in FIG. 3. Since there is always at least a small lateral component to any compressive force applied to the spring, the bending occurs readily. Moreover, such bending is assisted by the fact that the spring can not be mounted perfectly perpendicular to the ground and is subjected to lateral forces due to movement with respect to the ground. When the spring is bent as shown in FIGURE 3, the convolutions can not compress because of the tight coiling of the spring. Hence, the convolutions become separated at one side as shown at 52. This causes a general elongation of the spring member.

A ball socket 54 is threaded onto the exterior of the lower end of spring member 50. This ball socket may be molded from plastic as shown; or it may be made from rubber, metal or any other suitable material. In addition, the ball socket might be molded onto the spring member 50 instead of being screwed thereon. A ground-engaging member in the form of a ball 56 is rotatably seated in the lower end of ball socket 54. This ball will provide a rolling contact with the ground to reduce greatly the wear of the ground-engaging member and is made of a tough, wear resistant material, such as steel.

A plug 60 is threaded into the lower end of spring 50 prior to mounting of the ball socket. An upstanding projection 62 extends from the upper surface of plug 60. A coil spring 66, the purpose of which will be explained hereinafter, has its lower end looped through an opening 64 in projection 62.

A switch operating member 70, which may comprise ordinary rubber-covered, stranded flexible wire is linked at its lower end with a loop 68 at the upper end of coil spring 66. Switch operating member 70 extends upwardly through the spring member 50, clamping member 36, and pipe coupling 32 to a point within nipple 24. It will be noted that there is substantial clearance between the member 70 and the spring 50, so that frictional contact is eliminated. The upper end of switch operating member 70 is connected to the bottom of an insulating link 72. The upper end of link 72 is coupled to a threaded switch contact supporting rod 76 by means of a wire loop 74 which extends through an opening in the lower end of the rod 76.

A discoidal switch contact 78, which may be constructed of rugged, heavy gauge metal, is threaded on the switch contact supporting rod 76 and held by lock nuts 80 and 82 which maintain switch contact 78 in its desired position on supporting rod 76. Switch contact 78 has approximately the same diameter as the flange 26 of nipple 24 and is normally disposed, under the influence of biasing means to be described hereinafter, in spaced confronting relationship to flange 26, which constitutes a mating contact. A screw eye 84 at the upper end of switch contact supporting rod 76 is linked by a wire loop 86 to an insulating link 88. A coil spring 90, which normally serves to bias switch contact 78 out of engagement with flange 26, is connected to the upper end of insulating link 88. The upper end of coil spring 90 is linked to the eye 92 of a screw eye 94. The upper end of screw eye 94 is threaded within an internally threaded boss 96 which extends downwardly from the upper wall 98 of housing 20. An insulated wire 100 is soldered or otherwise fixed to the upper end of switch contact supporting rod 76 and extends through an opening in a side wall of housing 20, supported by a bushing 102, to an indicating circuit to be described hereinafter.

The means for adjustably mounting the housing 20 on an axle or axle housing of a vehicle will now be described. A pair of generally vertically disposed but somewhat inclined slots 104 is provided in a back wall of housing 20. These slots are provided with a plurality of vertically spaced, laterally offset portions 106 which define pairs of uniformly spaced notches at different heights and different lateral positions. A mounting plate 108, best shown in FIGURE 5, is provided with a pair of outstanding threaded studs 110 spaced apart a distance equal to the spacing of notches 106. The studs are preferably located off-center with respect to the length and height of plate 108, and are adapted to extend through notches 106 to receive nuts 112 within housing 20 (see FIG. 2). When it is desired to make a gross adjustment in the height of the ground-engaging element 56 relative to the ground, as when the vehicle loading or tire inflation is changed the nuts are loosened, the studs 110 are slipped along slots 104 to an appropriate pair of corresponding notches 106, and the nuts tightened. The inclination of slots 104 permits lateral as well as vertical adjustment. Four vertical slots 114 are provided adjacent the corners of mounting plate 108. Pairs of bolts 116 (FIG. 1) extend through slots 114 over and under the axle 12 and pass through vertical slots 120 in the ends of a pair of plates 118 located on the opposite side of the axle. The bolts are adjusted in slots 114 for snug engagement with the axle, and then the assembly is fixed by nuts 122 threaded onto the ends of the bolts. The mounting plate may be inverted to obtain a wide range of mounting height.

It is sometimes necessary to mount the low tire indicating device on a vehicle in which there is very limited clearance above the axle or axle housing. The modification of FIGURE 6 is arranged to make it possible to mount the housing on the axle 12 without extending materially above the plane of the upper surface of the axle. As shown in the figure, this is accomplished by disposing the long dimension of housing 20' horizontally. As in the embodiment of FIGURE 2, switch contact mounting rod 76 extends through an opening in the bottom wall of the housing (which is now a long wall) into the interior of the housing. A switch contact 78 is mounted on rod 76 in spaced confronting relation to nipple flange 26 as before. Since the narrow dimension of housing 20' is vertically disposed, the reduction in space above the rod makes it necessary to secure the end of the switch operating member to a side wall of the housing. Thus, an internally threaded boss 124 projects inwardly from a side wall of the housing to receive a screw eye 126 with a horizontal eye portion 188 in axial alignment with switch contact supporting rod 76. An additional screw eye 130 extends through an opening in the opposite side wall of housing 20' and is secured in place by means of a wing nut 132 and washer 134. A wire link 136 is connected to eye portion 84 of switch contact supporting rod 76 and engages one end of an insulating link 138. The other end of insulating link 138 is connected to a wire-like biasing coil spring extension 139 which is passed upwardly through eye 128 and laterally towards screw eye 130 to the body of biasing coil spring 140 which is in turn secured to the eye of screw eye 130. The housing 20' may be secured to an axle or axle housing by a mounting assembly of the type previously described.

The wiring diagram of FIGURE 7 shows how four low tire indicating devices of this invention may be connected to an alarm 142 located in an automotive vehicle within the purview of the driver. This alarm may, for example, be a buzzer, bell or indicating light. Each of the switches 144, 146, 148 and 150 represents a switch comprised of switch contacts 78 and 26 forming part of a device of this invention located adjacent each of four tires of a trailer, automobile or truck, for example. Switches 144, 146, 148 and 150 are connected in parallel between one side of alarm 142 and ground. The other side of alarm 142 is connected through a switch 152, provided for de-energizing the system when desired, and a fuse 154 to a battery 156, which may be the storage battery of the vehicle. Normally, one side of the battery is connected to the vehicle chassis, which constitutes the system ground. The connections from switches 144, 146, 148 and 150 to the chassis ground is made by virtue of the conductive contact between the housings 20 and the axle or axle housing. Normally, the housing, nipple 24, the mounting assembly, and the axle or axle housing are all formed of conductive material. If an ungrounded circuit is desired, switch contact 26 may be insulated from the chassis and connected to the alarm by a separate wire.

The operation of the low tire indicating device of this invention will be best understood from a comparison of FIGURES 2 and 3. FIGURE 2 is illustrative of the condition of the device when it is properly adjusted and mounted on a vehicle adjacent a tire having normal tire inflation. The ground-engaging ball 56 is spaced above the roadway 58. Switch contact 78 is kept in spaced confronting relation to contact 26 by biasing spring 90. The tightly coiled tubular spring member 50 is approximately vertically disposed and unbent. The only tension in switch control member 70 is due to the interplay of biasing spring 90 and protective spring 66.

When the tire becomes deflated, ground-contacting ball 56 engages the ground 58, as shown in FIGURE 3. This causes spring member 50 to bend and elongate as previously described. This elongation of spring member 50 exerts a pull upon switch control member 70 through plug member 60 secured to the lower end of the spring member. The switch control member moves downwardly against the bias of return spring 90, which is chosen to be a more flexible spring than protective spring 66, which normally does not expand appreciably. This brings switch contact 78 into engagement with contact 26 to close the circuit to alarm device 142. The end of wire 100 deflects slightly with movement of contact 78. Since switch contact 78 is disc-shaped and contact 26 is annular, the engagement between them is positive and certain by virtue of the large area of contact.

An important feature of this invention is the provision of protective means to protect the switch control member 70 and switch contact 78 from damage in the event spring member 50 is bent excessively as when ground-engaging ball 56 encounters a bump or other high point in the roadway. After switch contact 78 engages contact 26, any further tension applied to the switch control member is taken up in protective spring member 66 which becomes expanded as shown in FIGURE 3. Thus, after contact is made between switch contact 78 and contact 26, the tension applied in switch control member 70 is limited to a value insufficient to damage switch control member 70 and switch contact 78.

The numerous adjustments possible in the low tire indicating device of my invention greatly enhance its flexibility and adaptability to different situations. The offset notches 106 on housing 20 permit the device to be mounted at different heights when it is placed on vehicles having axles or axle housings spaced different distances above the ground. After the device is mounted, the position of pipe coupling 32 on nipple 24 may be adjusted by threading the coupling to a desired position to provide a fine adjustment of the spacing of the ball 56 above the ground. This adjustment is also convenient when it is desired to adjust the device for tires having different amounts of inflation. It is sometimes desired to adjust the sensitivity of the switch so that when, for example, it is necessary to drive over a rough road the switch will not close unduly. The sensitivity adjustment is effected by appropriately moving the switch contact 78 to a desired position on switch contact supporting rod 76. Adjustment of screw eye 94 in threaded boss 96 tends to control the amount of bias applied to switch contact 78 and serves as a further adjustment of the spacing of the switch contact 78 from the contact 26. In the embodiment of FIGURE 6, adjustment of screw eye 130 serves the same purposes.

From the foregoing description it will be apparent to those skilled in the art that the present invention provides unique and improved low tire indicating devices. While there have been shown and described what are now believed to be preferred embodiments of the invention, it is apparent that changes can be made in these embodiments without departing from the principles and spirit of the invention, the scope of which is defined in the appended claims. Accordingly, the foregoing embodiments are to be considered illustrative, rather than restrictive of the invention, and those modifications which come within the means and range of equivalency of the claims are to be included therein.

The invention claimed is:

1. A low tire indicator or the like comprising: a first substantially rigid switch contact, a second substantially rigid switch contact, means biasing said first switch contact to a first position indicative of normal tire inflation, a switch control member coupled to said first switch contact, means responsive to a low tire condition for pulling said switch control member to bring said first switch contact to a second position in firm contact with said second switch contact, indicative of said low tire condition, and protective means for limiting the tension in said switch control member exerted by said means responsive to a low tire conditon after said first switch contact is brought to said second position, said protective means comprising a coil tension spring connected mechanically in series with said switch control member and said first switch contact, said coil tension spring being located on the same side of said first switch contact as said switch control member and said means responsive to a low tire condition.

2. A low tire indicator or the like as recited in claim 1 further comprising a housing, said housing having a bottom wall provided with an opening, said first switch contact being mounted within said housing adjacent said opening, and said means biasing said first switch contact to said first position being adjustably connected to another wall of said housing.

3. A low tire indicating device as defined in claim 2 further characterized in that said another wall is the top wall of said housing and in that said biasing means is adjustably connected to said top wall of said housing at a point opposite said opening.

4. A low tire indicating device as defined in claim 2 further characterized in that said another wall is a side wall of said housing.

5. A low tire indicating device as defined in claim 4 further characterized in that said housing is provided with a screw-eye extending from the opposite side wall of the housing, the eye of said screw-eye being in alignment with said opening, and means connecting said biasing means to said switch contact comprising a wire extending upwardly from said switch contact through said eye and laterally to said biasing means.

6. A low tire indicator or the like as defined in claim 3, wherein said second switch contact comprises an annular contact member, and said first switch contact comprises a discoidal contact member, said discoidal contact member being mounted on a rod extending through said annular contact member, said rod being coupled to said switch control member for movement axially of said annular contact member in response to said low tire condition in opposition to said biasing means to bring said discoidal contact member into contact with said annular contact member.

7. A low tire indicator or the like as defined in claim 6 further comprising means for adjusting the position of said discoidal contact member on said rod for adjusting the sensitivity of said indicator.

8. A low tire indicating device or the like comprising: means for mounting the device on the chassis of a vehicle, a hollow, elongated, bendable spring member depending from said mounting means, a ground-engaging member mounted on the lower end of said spring member, an elongated, flexible, substantially inextensible switch control member extending upwardly within said spring member, a first substantially rigid switch contact coupled to said switch control member, a second substantially rigid switch contact fixedly mounted with respect to said mounting means, first spring means connected mechanically in series with said switch control member and the lower end of said spring member, second spring means coupled between said first switch contact and said mounting means whereby said switch control member is ordinarily maintained under tension with said first switch contact maintained in spaced relation to said second switch contact, said second spring means having greater flexibility than said first spring means whereby upon engagement of said ground-engaging member with the ground the spring member will bend and cause the switch control member, first, to expand the second spring means to bring the first switch contact into firm engagement with said second switch contact and, then, to expand the first spring means to limit the tension in said switch control member.

9. A low tire indicating device as recited in claim 8 further characterized in that said switch control member is air-spaced from the inner surface of said spring member, whereby said switch control member is freely movable within the spring member without impeding the flexibility of said spring member.

10. A low tire indicating device or the like comprising a housing, means for adjustably mounting the housing on an axle of a pneumatic tired vehicle, said housing having an opening in its bottom wall, a hollow, elongated, tightly coiled, bendable spring member, means mounting said spring member on said housing with its upper end in alignment with said opening, a ground-engaging member mounted on the lower end of said spring member, a switch control member and spring means coupled mechanically in series to the lower end of said spring member, said switch control member extending upwardly through said spring member, a switch contact coupled to the upper end of said switch control member within said housing adjacent said opening, additional spring means coupled between said switch contact and said housing for biasing said switch contact away from said housing adjacent said opening, and an additional switch contact mounted within said housing about said opening in a position to be engaged by the first-mentioned switch contact upon downward movement thereof, said additional spring means having greater flexibility than the first-mentioned spring means so that movement of said switch control member in response to bending of said spring member upon engagement of said ground engaging member with the ground will first substantially expand said additional spring means and then, after the first-mentioned switch contact has been moved into firm engagement with said additional switch contact, will substantially expand the first-mentioned spring means to limit the tension in said switch control member.

11. A low tire indicating device as defined in claim 10 further characterized in that said means for mounting said spring member on said housing comprises a nipple, said nipple having a flange at the upper end thereof engaging the inside of said bottom wall of said housing about said opening, said flange comprising said additional switch contact, said nipple extending downwardly through said opening about said switch control member; in that said nipple, said housing, and said mounting means are conductive, whereby said flange is grounded to the chassis of said vehicle; in that said switch contact is moved into engagement with said flange upon bending of said spring member to ground said switch contact; in that an insulated lead wire extends from said switch contact through an opening in said housing; in that an insulating link is coupled between said switch contact and said switch control member; and in that an insulating link is coupled between said switch contact and said biasing means.

12. A low tire indicating device as defined in claim 10 further characterized in that said means for mounting said spring member on said housing comprises a threaded nipple depending from said opening, a threaded sleeve adjustably mounted on said threaded nipple, said threaded sleeve supporting clamping means at the lower end thereof, the upper end of said spring member being secured by said clamping means.

13. A low tire indicating device as defined in claim 10 further characterized in that said first-mentioned switch contact comprises a disc adjustably mounted on a rod extending through said opening, said switch control member being coupled to said rod.

14. A low tire indicating device as recited in claim 8 further characterized in that said ground-engaging member comprises a ball socket mounted on the lower end of said spring member, and a ground-engaging ball seated in said ball socket, whereby the ground-engaging member will have rolling contact with the ground upon engagement therewith.

15. A low tire indicating device as defined in claim 10 further characterized in that the mounting means comprises a pair of parallel generally vertically disposed slots in the back wall of said housing, said slots having a plurality of laterally offset notches at corresponding vertical positions thereof, a plate, a pair of studs extending from said plate, said studs being laterally spaced by a distance substantially equal to the lateral spacing of said notches, said studs extending inside the housing through said notches, means inside said housing for securing said studs respectively in a corresponding pair of said laterally offset notches, and means for mounting said plate on said axle.

16. A low tire indicating device as defined in claim 15 further characterized in that the means for mounting said plate on said axle comprises a pair of bolts adapted to extend above said axle, a pair of bolts adapted to extend below said axle, slots adjacent each of the corners of said plate, each of said bolts extending through a respective one of said slots, strap means adapted to be located on the opposite side of said axle, and means for adjustably securing the bolts to said strap means.

References Cited in the file of this patent

FOREIGN PATENTS

| | | |
|---|---|---|
| 416,701 | Great Britain | Sept. 19, 1934 |
| 451,666 | France | Feb. 17, 1913 |